Patented Feb. 5, 1952

2,584,159

UNITED STATES PATENT OFFICE 2,584,159

PROCESS FOR PRODUCING 2-HALO-ALLO-PREGNANE-17α-OL-3,20-DIONE

George Rosenkranz, Stephen Kaufmann and John Pataki, Mexico City, Mexico, assignors to Syntex, S. A., Mexico City, Mexico, a corporation of Mexico No Drawing. Application September 19, 1949, Serial No. 116,625

2 Claims. (Cl. 260—397.4)

The present invention relates to a new process for producing 2-halo-allopregnane-17α-ol-3,20-dione. More particularly, the present invention relates to new allopregnane derivatives and to a novel process for preparing these derivatives. The new compounds, with which this present invention is particularly concerned, are derivatives of allopregnane having a hydroxy group at the 17α position. Compounds of this character are especially suitable as therapeutics and/or intermediates for the production of therapeutically useful products.

In copending application Serial No. 116,624, filed September 19, 1949, there is disclosed a process for the production of Δ$^{1,2}$-allopregnene-17α-ol-3,20-dione, starting with the known compound allopregnane-3β,17α-diol-20-one.

In the process described in the aforementioned application, the allopregnane-3β,17α-diol-20-one is treated with 1 mol of bromoacetamide in the presence preferably of pyridine to produce allopregnane-17α-ol-3,20-dione. Thereafter the allopregnane-17α-ol-3,20-dione is treated with 1 mol of bromine to produce 2-bromo-allopregnane-17α-ol-3,20-dione, and finally the 2-bromo-allopregnane-17α-ol-3,20-dione is subjected to dehydrobromination to produce Δ$^{1,2}$-allopregnene-17α-ol-3,20-dione.

It has been found in accordance with the present invention, however, that if allopregnane-3β,17α-diol-20-one is treated with 2 mols of bromoacetamide in the absence of pyridine not only is the allopregnane-3β,17α-diol-20-one oxidized but also brominated at position 2 to produce 2-bromo-allopregnane-17α-ol-3,20-dione. This reaction may be represented by the following formula:

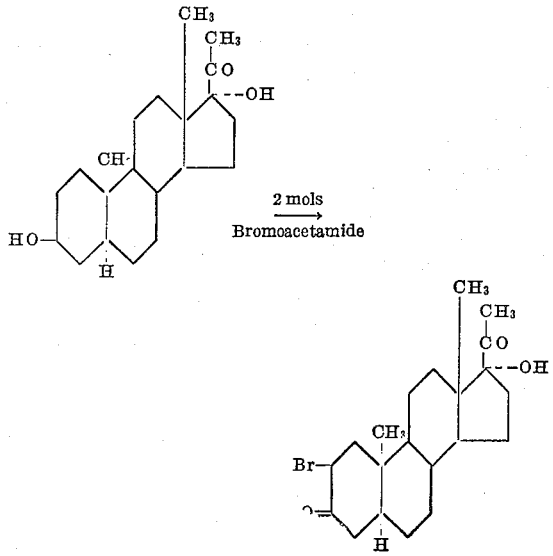

In the process of the present invention, although bromoacetamide is preferred, other brominated or chlorinated amides, both aliphatic and aromatic, may be used, such as bromotoluenesulfonamide, bromophthalimide, bromosuccinimide or chlorosuccinimide. In other words, the amides which may be used in the present reaction may be exemplified by the following formula:

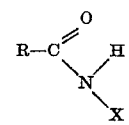

wherein R is an aromatic or aliphatic radical, and X is selected from the group consisting of bromine and chlorine. Of course where the chloro compound is used, a chloro derivative will be prepared.

In practicing the present invention the allopregnane-3β,17α-diol-20-one is dissolved in a suitable solvent, such as tertiary butyl alcohol and the bromoacetamide is added. Thereafter the reaction mixture is allowed to stand for approximately twenty hours at room temperature. A small amount of sodium acetate in water solution is then added and the resultant solution concentrated in vacuo. The concentrate is then diluted with water to precipitate 2-bromo-allopregnane-17α-ol-3,20-dione. The 2-bromo-allopregnane-17α-ol-3,20-dione can then be recrystallized from ethanol.

The following example serves to illustrate the present invention but is not intended to limit the same:

Example

To a solution of 1 g. of allopregnane-3β,17α-diol-20-one in 200 cc. of tertiary butyl alcohol 0.91 g. of N-bromoacetamide were added. After standing for 22 hours at room temperature, 2 g. of sodium acetate in 50 cc. of water were added and the solution was concentrated in vacuo. The concentrate was diluted with 500 cc. of water, whereby a white precipitate was formed which was filtered and recrystallized from ethanol; M. P. 188–191° C. with decomposition. It gave no depression of the melting point when mixed with the bromo-ketone prepared in accordance with Example II of copending application Serial No. 116,624.

What is claimed is:

1. A process for the production of 2-halo-allopregnane-17α-ol-3,20-dione having the following formula:

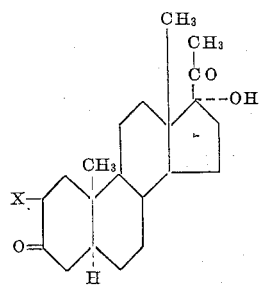

wherein X is selected from the group consisting of chlorine and bromine which comprises reacting allopregnane-3β,17α-diol-20-one with an amide having the following formula:

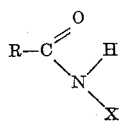

wherein R is selected from the group consisting of aromatic and aliphatic radicals and X is selected from the group consisting of chlorine and bromine, in the proportion of 1 mol of allopregnane-3β,17α-diol-20-one to 2 mols of the amide.

2. A process for the production of 2-bromo-allopregnane-17α-ol-3,20-dione which comprises reacting allopregnane - 3β,17α - diol-20-one with bromoacetamide in the proportion of 1 mol of allopregnane - 3β,17α - diol - 20-one to 2 mols of bromoacetamide.

GEORGE ROSENKRANZ.
STEPHEN KAUFMANN.
JOHN PATAKI.

REFERENCES CITED

The following references are of record in the file of this patent:

Djerassi: Chemical Reviews 43, pages 272, 312 (1948).